March 8, 1938.  A. E. SCHUBERT  2,110,475
MINIATURE FILM HOLDER
Filed Oct. 21, 1936
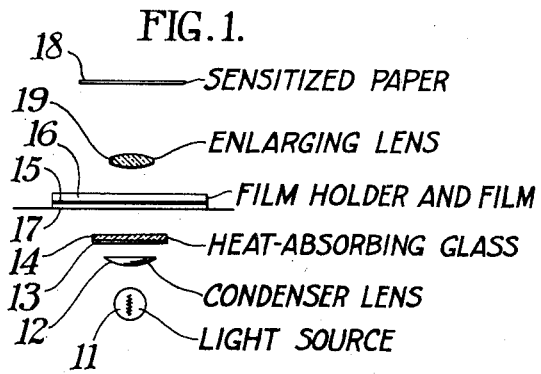
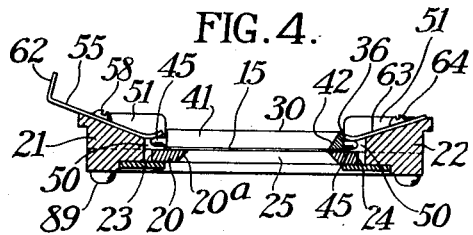
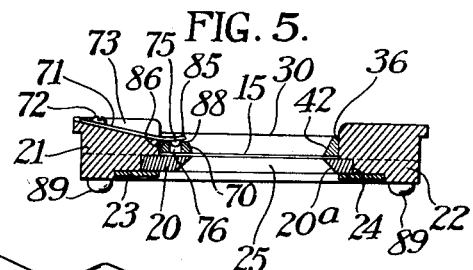
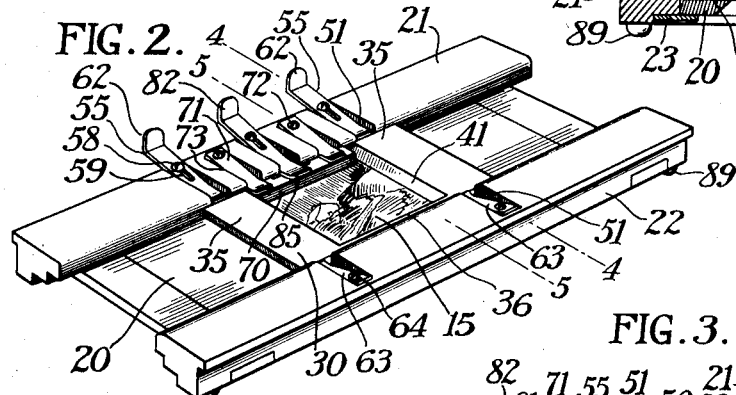
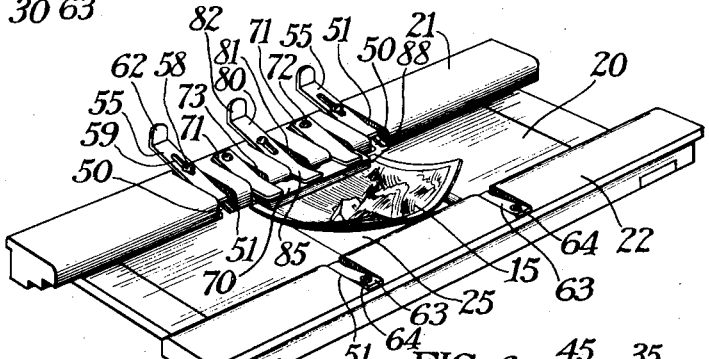
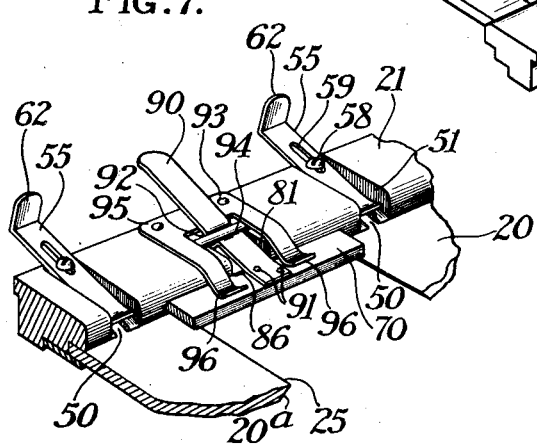
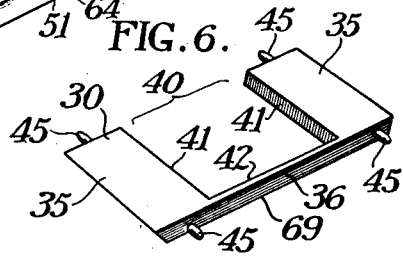
Alvin E. Schubert
INVENTOR.
BY
ATTORNEYS Patented Mar. 8, 1938

2,110,475

UNITED STATES PATENT OFFICE 2,110,475

MINIATURE FILM HOLDER

Alvin E. Schubert, Rochester, N. Y., assignor to Eastman Kodak Company, Rochester, N. Y., a corporation of New Jersey Application October 21, 1936, Serial No. 106,832

15 Claims. (Cl. 88—24)

This invention relates to photography, and more particularly to a negative film holder for use with an enlarging printer and adapted to hold a single miniature negative picture frame cut from a film strip. This holder is particularly designed for use with the enlarging printer shown in Patent Number 2,033,712, to R. S. Hopkins, dated March 10, 1936.

One object of the invention is the provision of a holder of the class described adapted to hold a single miniature negative picture frame to permit an enlargement to be made therefrom. Another object of the invention is the provision of such a holder which is adapted to be used with a badly curled negative. A further object of the invention is the provision of a holder for miniature negatives which engages the film only at the edges thereof and thus eliminates the use of clamping glass member for holding the film in flat position. A still further object of the invention is the provision of such a holder which eliminates the objectionable "Newton rings" which may be present when glass film-clamping members are used. A still further object of the invention is the provision of such a holder which is relatively simple in construction, inexpensive to manufacture, and effectively used.

To these and other ends the invention resides in certain improvements and combination of parts, all as will be hereinafter more fully described, the novel features being pointed out in the claims at the end of the specifications.

In the drawing:

Fig. 1 is a diagrammatic view of the above-mentioned enlarger showing the relation thereto of the miniature negative holder constructed in accordance with the present invention.

Fig. 2 is a perspective view of the assembled holder constructed in accordance with the preferred embodiment of the invention.

Fig. 3 is a perspective view of the holder illustrated in Fig. 2 with the locking slide removed to better show the arrangement of the various parts.

Fig. 4 is a vertical sectional view taken substantially on the line 4—4 of Fig. 2 showing the arrangement of the positioning and locking means for the locking slide.

Fig. 5 is a vertical sectional view taken substantially on the line 5—5 of Fig. 2 showing the positioning means for the edge holding clamping member.

Fig. 6 is a perspective view of the locking slide.

Fig. 7 is a perspective view of the holder illustrated in Fig. 2 showing a modified clamping and positioning means for the edge holding member.

The same reference numerals throughout the several views indicate the same parts.

Referring now to Fig. 1 wherein is shown a diagrammatic view of the enlarger shown in Patent Number 2,033,712, to R. S. Hopkins, with which the holder of the present invention is adapted to be used. This enlarger comprises, in general, a light source 11 adapted to project rays of light through the condensing lens 12, a ground glass screen 13, heat absorbing glass 14, and then through a single miniature negative picture frame 15 mounted in the holder generally indicated by the numeral 16 and supported by the table top 17. The image from the negative in the holder 16 is then projected through a suitable enlarging lens 19 onto a sensitized receiving service 18 such for example, as a sheet of sensitized photographic paper.

In the usual type of miniature film holders for use with enlarging printers, the negative is clamped, in strip form, between two sheets of glass. In order to insure clear enlargements, it is essential that the surfaces of these glass sheets be thoroughly clean. Furthermore, the clamping of the film between glass produces Newton rings which are highly objectionable, for reasons well known to those in the art. In addition, when badly curled or dried films are encountered, it is inconvenient to load a holder of this type with a single miniature negative picture frame which has been cut from a film strip.

To overcome these difficulties, the present invention provides a holder designed to operate with a single miniature negative picture frame, and provided with film clamping means which engages the edges only of the film to maintain the latter in a flat or uniplanar position. As the clamp engages the edges only of the film, the latter may be easily and quickly loaded in the holder even when the film is badly curled or dried. No glass whatever is used for clamping the film so that the cleaning of the glass surfaces, as well as the formation of the Newton rings caused by the clamping of the film between glass, is thereby entirely eliminated.

Referring now to Fig. 2, wherein is shown a miniature negative holder constructed in accordance with the preferred embodiment of the invention, this holder is preferably formed of metal, or other suitable substantially rigid sheet material, to provide a bottom 20 adapted to be supported on the table top 17, and side rails 21 and 22 which extend above the bottom 20 and along the opposite edges 23 and 24 thereof, as clearly illustrated in Figs. 2, 3, 4, and 5. The bottom 20 is provided with a viewing aperture 25 by which the single miniature picture frame 15 may be viewed by transmitted light through the aperture 25. The picture frame 15 is held in flat position on the bottom 20 and in registry with the aperture 25 by means of an upper plate or locking slide generally indicated by the numeral 30, and to be presently more fully described. The bottom 20 is beveled at 20A adjacent the aperture 25 to prevent reflection, and to give as sharp an image as possible of the aperture 25, all of which is well known to those in the art.

The locking slide 30 is preferably formed of metal, and is of a substantially U shape having spaced relatively wide side walls 35 and a narrow end wall 36 which connects the side walls 35 at one end thereof, as clearly illustrated in Fig. 6. The walls 35 and 36 are so arranged as to provide a central opening or aperture 40 arranged to be brought into registry with the viewing aperture 25 to permit projecting of the image on the picture frame 15. The inner edges of the side and end walls 35 and 36 are beveled as shown at 41 and 42 respectively for the purposes pointed out above in connection with the aperture 25.

In order to position the locking slide 30 so that the opening 40 thereof will be in registry with the viewing aperture 25, and to enable the sides 35 and end 36 to engage the film 15 adjacent the edges thereof, the sides 35 of the plate 30 are formed with projections or prongs 45 arranged to be recessed in slots 50 formed in the bottom of aligned grooves 51 which extend transversely of the side rails 21 and 22, as clearly illustrated in Figs. 2, 3, and 4. The prongs 45 and the slots 50 thus cooperate to position the locking slide 30 on the bottom 20, so that the prongs 45 and the slots 50 may be broadly considered as positioning means for the locking slide 30.

The locking slide 30 is preferably locked in film engaging position by means adapted to close the slots 50. This locking means comprises, in part, thin sheet metal locking slide members 55 arranged to slide transversely in the grooves 51 in the side rail 21 to cover and uncover the slots 50 formed therein. Each of the members 55 is slidably secured to the side rail 21 by means of a screw 58 which extends through a slot 59 formed in the member 55 and into a registering threaded opening in the bottom of the groove 51. The outer end of each of the members 55 is provided with an upturned finger-piece 62 to facilitate the moving of the member 55 in the groove 51 transversely of the rail 21. The slots 50 in the side rail 22 are, however, preferably closed by stationary members preferably in the form of resilient metal clips 63 secured in the grooves 51 by screws 64, the purpose of which structure will be presently described.

To insure proper clamping of the film 15, the grooves 51 are preferably beveled downwardly toward the bottom 20, and the prongs 45 are so positioned in the slots 50 as to extend slightly above the bottom of the grooves 51, as shown in Figure 4. When the locking slide 30 is to be positioned in the holder, the slide is slid transversely of the holder toward the side rail 22 so that the lower edge 69 of the slide will iron or smooth out the film 15 to cause the latter to lie flat on the bottom 20. As the slide 30 is thus moved, the prongs 45, adjacent the end 36, are inserted under the resilient clips 63 and are cammed thereby into the slots 50 on the side rail 22, the inner ends of the clips 63 being bent up slightly to facilitate insertion of the prongs 45 thereunder. The clips 63 thus afford in effect a hinged connection whereby the slide 30 may then be pivoted to bring the remaining prongs 45 into the slots 50 on the side rail 21. The prongs 45 are then locked in position on the rail 21, by moving the locking members 55 inwardly along the beveled grooves 51 and into engagement with the upper surfaces of the prongs 45 to cam the latter into the slots 50, as illustrated in Fig. 4. The members 55 and 63, positioned in the grooves 51, thus move the prongs 45 into the slots 50 and force the slide 30 downwardly to engage the film 15 along three edges thereof to securely clamp the film in flat position on the bottom 20 and in registry with the aperture 25. As the slide 30 holds the film in position, it may be broadly considered as a clamp for securing the film in position on the bottom 20. When the locking slide 30 is thus in a film engaging position the aperture 40 thereof is automatically brought into registry with the viewing aperture 25 in the bottom 20.

It is apparent from an inspection of the drawing and from the above description, that the locking slide 30 will effectively clamp the film 15 in position on the bottom 20 and in registry with the viewing aperture 25. It is preferred, however, to provide additional means for engaging and clamping the remainder or free edge of the film adjacent the side rail 21. This additional means is preferably in the form of an edge holding clamp 70 adjacent the edge of the aperture 25 and secured to the side rail 21 by means of clips 71 fastened by screws 72 in the beveled grooves 73 formed in the side rail 21, intermediate the grooves 51 as clearly illustrated in Figs. 2 and 3. The inner end of each of the clips 71 is formed with a depending projection or nib 75 arranged to be recessed in a registering opening 76 of the edge holding clamp 70 to position the latter relative to the edge of the aperture 25.

The clamp 70 is normally slightly spaced from the bottom 20 to permit an edge of the film 15 to be inserted thereunder as clearly shown in Figure 3, but is movable toward the bottom 20 to clamp the edge of the film. To this end, a locking member 80 is movable laterally in a beveled groove 81, similar to the grooves 51, and engages the edge holding clamp 70 to move or cam it downwardly into film clamping position. The outer end of the member 80 is bent upwardly to provide a finger-piece 82. To facilitate initial engagement of the member 80 with the clamp 70, the inner edge of the member 80 is bent upwardly at 85 and the leading edge of the clamp 70 is slightly beveled, as shown at 86, Fig. 5. The edge holding clamp 70 thus cooperates with the locking slide 30 to not only hold the film 15 in a flat or uniplanar position on the bottom 20, but also positions the film relative to the viewing aperture 25. In addition, the clamp 70 securely holds the film 15 on the bottom 20, and prevents the film from being pulled out of registry with the aperture 25 when the slide 30 is moved to iron or smooth out the film 15, in the manner pointed out above. The inner edge of the clamp 70 is also tapered or beveled as shown in 88, similar to the edges 41 and 42 of the slide 30, for reasons above pointed out.

The film holder, formerly used in connection with the printer disclosed in the above-mentioned patent, consists of two layers of glass between which the film strip was clamped. In order to compensate for the elimination of the bottom layer of glass in such a holder, the holder embodied in the present invention is slightly elevated above the table top 17. To this end, the side rails 21 and 22 are provided with short depending members or nibs 89 which rest on the table 17 and support the holders slightly elevated thereabove.

The device operates as follows: The perforated edge of the film 15 is inserted under the edge holding clamp 70 and the sliding member 80 is then moved inwardly or transversely of the holder to move the clamp 70 into locking engagement with the film 15, as shown in Figs. 3 and 5. The locking slide 30 is then slid transversely of the holder to iron or smooth out the film 15 and to bring the prongs 45, adjacent the end wall 36, under the spring clips 63. The slide 30 is then pivoted about the hinges 63 to bring the remaining prongs 45 into the slots in the side rail 21. Then, by moving the locking slide members 55 inwardly, the prongs 45 are locked in position in the side rail 21, and the locking slide 30 is pressed or cammed downwardly to engage the film 15 at the three edges thereof, the remaining edge being held by the clamping member 70. The film is thus secure and clamped in flat position on the bottom 20 and in registry with the apertures 25 and 40. When the film is to be removed, it is only necessary to slide the members 55 outwardly or to the left, as viewed in Fig. 4, and then to lift out the slide 30, after which the edge holding clamp 70 is moved to release position by sliding the member 80 outwardly, or to the left as viewed in Fig. 5. The film 15 may then be removed and a new film inserted in the holder.

Fig. 7 shows a modification of the holding and positioning means for the edge holding clamp 70. This modification embodies a lever or finger-piece 90 firmly secured to the clamp 70 in any suitable manner as for example, by means of rivets 91. The finger-piece is formed with an offset or rib 92 adapted to rest in the bottom of the slot 81 on the side rail 21, the slots 73 being omitted in this modification. A rod or pintle 94 lies within the rib 92 and has the end secured to a bifurcated flat spring member 95 which is secured to the side rail 21 as by rivets 93. The free end of the member 95 is formed to provide spaced resilient fingers 96 which yieldably engage the clamp 70 to urge the latter toward the bottom 20 so as to clamp the film 15 thereon. The pressure of the operator's fingers on the outer end of the lever 90 will raise the clamp 70, against the resistance of the resilient finger 96, to permit insertion of one edge of the film 15 under the edge holding clamp 70, as is obvious from an inspection of Fig. 7. Upon releasing the finger-piece 90, the resilient fingers 96 urge the clamp 70 toward the bottom 20 to retain the film 15 in clamped position thereon, in the manner illustrated in the embodiment shown in Fig. 3.

It is apparent from the above description that the present invention provides a film holder adapted to operate with a single negative picture frame cut from a strip of miniature film. It is also apparent that the holder clamps the film adjacent the edges only thereof and retains the film in a flat position without the use of the usual glass film-clamping strips. The necessity of cleaning glass surfaces as well as the presence of Newton rings, is thereby eliminated.

While certain embodiments have been shown, this is by way of illustration only as it is contemplated that the inventive idea may be carried on in a number of ways. The present invention, therefore, is not to be limited to the precise details shown but is intended to cover all variations and modifications which fall within the spirit of the invention and the scope of the appended claims.

I claim:—

1. A film holder comprising, in combination, a part having a bottom formed with a viewing aperture, a clamp associated with said part and arranged to engage a film adjacent the edges thereof to hold said film in flat position between said bottom and said clamp and in registry with said aperture, means including a resilient member on said part and engaging said clamp to position the latter on said bottom relative to said aperture, and means on said part independent of said positioning means but cooperating therewith to lock said clamp in film engaging position.

2. A film holder comprising, in combination, a part having a bottom and side secured to said bottom along opposite edges thereof, said bottom being formed with a viewing aperture, a clamp detachably hinged to one of said sides and cooperating with said bottom to clamp a film therebetween and in registry with said aperture, and means on said sides for both positioning said clamp relative to said bottom and for securing the clamp in film engaging position.

3. A film holder comprising, in combination, a part having a bottom and sides secured to said bottom along opposite edges thereof, said bottom being formed with a viewing aperture, a clamp associated with said bottom and arranged to clamp a film therebetween and in registry with said aperture, means on said sides for positioning said clamp on said bottom and in registry with said aperture, and means on said sides independent of but cooperating with said first mentioned means to detachably secure said clamp in film engaging position.

4. A film holder comprising, in combination, a part having a bottom and sides secured to said bottom along opposite edges thereof, said bottom being formed with a viewing aperture, a clamp associated with said bottom and arranged to clamp a film therebetween and in registry with said aperture, means including slots on said sides arranged to receive portions of said clamp to position the latter on said bottom and in registry with said aperture, and independent means on said sides engaging said portions to detachably secure said clamp in film engaging position.

5. A film holder comprising, in combination, a part having a bottom and sides associated with said bottom along opposite edges thereof, said bottom being formed with a viewing aperture, a clamp associated with said bottom and arranged to clamp a film therebetween and in registry with said aperture, means including slots on said sides arranged to receive portions of said clamp to position the latter on said bottom and in registry with said aperture, resilient means on certain of said sides for closing certain of said slots, and movable means on others of said sides for closing others of said slots, said movable means cooperating with said resilient means for securing said clamp in film engaging position.

6. A film holder comprising, in combination, a part having a bottom and sides along opposite edges of said bottom, said bottom being formed with a viewing aperture, a clamp associated with said bottom and arranged to clamp a film therebetween and in registry with said aperture, means including slots on said sides arranged to receive portions of said clamp to position the latter on said bottom and in registry with said aperture, and means for closing said slots to lock and clamp in film engaging position.

7. A film holder comprising, in combination, a part having a bottom formed with a viewing aperture, means associated with said part and arranged to engage a film adjacent an edge thereof, independent means for engaging other edges of said film and cooperating with said first mentioned means to hold the film in flat position on said bottom and in registry with said aperture, means associated with said part for separately positioning each of said engaging means on said bottom relative to said aperture, and means for independently locking each of said film engaging means in position on said bottom.

8. A film holder comprising, in combination, a part having a portion thereof formed to provide a viewing aperture, an edge holding clamp associated with said part and arranged to engage a film adjacent an edge thereof, a locking slide associated with said part and arranged to engage other edges of said film and cooperating with said clamp to maintain the film in flat position on said portion and in registry with said aperture, and means associated with said part for separately positioning and locking said clamp and said slide in film engaging position.

9. A film holder comprising, in combination, a member having a bottom and sides secured to said bottom along opposite edges thereof, said bottom being formed with a viewing aperture, an edge holding clamp adjacent said aperture for engaging an edge of a film positioned on said bottom and in registry with said aperture, means on said side for both positioning said clamp and for moving it into film engaging position, a locking slide arranged to engage other edges of said film to retain the latter in flat position on said bottom, and means on said sides for positioning said slide relative to said aperture and for locking said slide in film engaging position.

10. A film holder comprising, in combination, a member having a bottom and sides secured to said bottom along opposite edges thereof, said bottom being formed with a viewing aperture, an edge holding clamp adjacent said aperture for engaging an edge of a film positioned on said bottom and in registry with said aperture, means on one of said sides and engaging said clamp to position the latter relative to said aperture, means independent of said first mentioned means for moving said clamp into film engaging position, a locking slide arranged to engage other edges of said film to retain the latter in flat position on said bottom, means on said sides for positioning said slide relative to said aperture, and means on said sides for locking said slide in film engaging position.

11. A film holder comprising, in combination, a member having a bottom and sides secured to said bottom along opposite edges thereof, said bottom being formed with a viewing aperture, an edge holding clamp adjacent said aperture for engaging an edge of a film positioned on said bottom and in registry with said aperture, means on one of said sides and engaging said clamp to position the latter relative to said aperture, means independent of said first mentioned means for moving said clamp into film engaging position, a locking slide arranged to engage other edges of said film to retain the latter in flat position on said bottom, means including slots on said slides arranged to receive portions of said slide to position the latter on said bottom relative to said aperture, and means on said sides for closing said slots to lock said slide in film engaging position.

12. A film holder comprising, in combination, a member having a bottom and sides secured to said bottom along opposite edges thereof, said bottom being formed with a viewing aperture, an edge holding clamp adjacent said aperture for engaging an edge of a film positioned on said bottom and in registry with said aperture, means on one of said sides and engaging said clamp to position the latter relative to said aperture, movable means on said one side arranged to engage said clamp to move the latter into film engaging position, a locking slide arranged to engage other edges of said film and cooperating with said clamp to hold the film in flat position on said bottom, said sides being formed with laterally extending slots, projections on said slide arranged to extend into said slots to position said slide relative to said aperture, stationary means on another of said sides for closing certain of said slots, and movable means on said one side arranged to close others of said slots and cooperating with said stationary means to detachably lock said slide in film engaging position.

13. A film holder comprising, in combination, a bottom formed with a viewing aperture, side rails secured to said bottom along opposite edges thereof and projecting above said bottom, an edge holding clamp associated with one of said rails adjacent said aperture, means on said one rail for positioning said clamp relative to said aperture, means on said one rail and independent of said positioning means for moving said clamp toward said bottom to clamp one edge of a film therebetween, a locking slide arranged to engage the remaining edges of said film and cooperating with said clamp to retain the film in flat position on said bottom, said side rails being formed with oppositely arranged slots, projections on said slide arranged to be positioned in said slots to position said slide relative to said aperture, and means for closing said slots to detachably secure said slide in film clamping position.

14. A film holder comprising, in combination, a part having a bottom and parallel side rails arranged along opposite edges of said bottom, said bottom being formed with a viewing aperture, an edge holding clamp adjacent said aperture and arranged to engage an edge of a film to hold the latter on said bottom and in registry with said aperture, means on one of said rails for positioning said holding clamp, means on said one rail for locking said holding clamp in film engaging position, a locking slide arranged to engage other edges of said film and cooperating with said holding clamp to retain the film in a flat position on said bottom, said rails being formed with a plurality of slots, projections on said slide extending into said slots to position said slide relative to said aperture, and means including members slidable relative to said slots and engaging said projections to detachably secure said slide in film engaging position.

15. A film holder comprising, in combination, a part having a bottom and parallel side rails arranged along opposite edges of said bottom, said bottom being formed with a viewing aperture, an edge holding clamp adjacent said aperture and arranged to engage an edge of a film to hold the latter on said bottom and in registry with said aperture, means on one of said rails for positioning said holding clamp, means on said one rail and slidable relative thereto and arranged to engage and move said holding clamp toward said bottom to clamp said edge therebetween, said rails being formed with a plurality of grooves having slots formed therein, a locking slide arranged to engage other edges of said film and cooperating with said edge holding clamp to retain the film in flat position on said bottom and in registry with said aperture, projections on said slide extending into said slots to position said slide relative to said aperture, stationary resilient means arranged in certain of said grooves to close the slots formed therein, and slidable means arranged in others of said grooves to close the slots therein, said resilient means and said slidable means detachably securing said slide in film engaging position.

ALVIN E. SCHUBERT.